Patented Jan. 20, 1953

2,626,278

UNITED STATES PATENT OFFICE 2,626,278

METHOD OF PREPARING ACYLOXYETHYL ISOCYANATES

Vernon P. Wystrach, Springdale, and Jack T. Thurston, Riverside, Conn., assignors to American Cyanamid Company, New York, N. Y., a corporation of Maine No Drawing. Application April 22, 1950, Serial No. 157,636

6 Claims. (Cl. 260—453)

This invention relates to the preparation of acyloxyethyl isocyanates represented by the general formula I 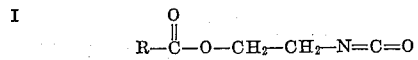

where R represents a radical selected from the class consisting of alkyl cycloalkyl and aralkyl radicals. Illustrative examples of radicals represented by R in the above formula are methyl, ethyl, propyl, isopropyl, butyl (n-butyl), sec.-butyl, pentyl, hexyl, octyl, nonyl, decyl, dodecyl, tetradecyl, hexadecyl, octadecyl, cyclopentyl, cyclohexyl, phenylmethyl, phenylethyl, etc.

Illustrative examples of isocyanates embraced by the above formula are the following:

β-acetyloxyethyl isocyanate
β-propionyloxyethyl isocyanate
β-butyryloxyethyl isocyanate
β-caproyloxyethyl isocyanate
β-heptylyloxyethyl isocyanate
β-caprylyloxyethyl isocyanate
β-nonylyloxyethyl isocyanate
β-capryloxyethyl isocyanate
β-lauroyloxyethyl isocyanate
β-myristoyloxyethyl isocyanate
β-palmitoyloxyethyl isocyanate
β-margaroyloxyethyl isocyanate
β-stearoyloxyethyl isocyanate
β-phenylacetyloxyethyl isocyanate
β-cyclohexanecarbonyloxyethyl isocyanate The isocyanates of the kind embraced by Formula I are prepared, in accordance with the present invention, by effecting reaction between phosgene and a compound represented by the general formula II 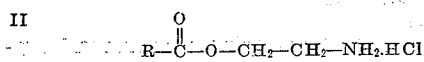

where R has the same meaning as given above with reference to Formula I. The reaction advantageously is carried out while the phosgene and the compound of the kind embraced by Formula II are in contact with each other in a liquid medium in which they are inert, e. g., benzene, toluene, xylene, chlorobenzene, tetrachloroethane, etc. Thereafter the desired isocyanate is isolated from the resulting reaction mass, for example by distillation.

The β-acyloxyethylamine hydrochlorides represented by Formula II can be produced, for instance, by effecting reaction between ethanolamine hydrochloride and an anhydride of a monocarboxylic acid, more particularly a saturated aliphatic (including saturated cycloaliphatic) monocarboxylic acid or an aryl-substituted, saturated aliphatic monocarboxylic acid, preferably with the aid of a suitable catalyst for the reaction, e. g., p-toluene sulfonic acid. Any of the available anhydrides of the said acids can be used, for instance acetic anhydride, propionic anhydride, butyric anhydride, valeric anhydride, caproic anhydride, heptanoic anhydride, caprylic anhydride, capric anhydride, lauric anhydride, etc. The β-acyloxyethylamine hydrochlorides also may be prepared by the reaction of ethanolamine hydrochloride with the corresponding acid chloride, e. g., caproyl, myristoyl, stearoyl, coconut oil fatty acids, etc., chloride. This reaction is best carried out in the presence of a catalyst such as p-toluene sulfonic acid. The lower homologues advantageously may be prepared from the acid anhydrides and the higher homologues from the acid chlorides.

In carrying out the reaction between the phosgene and the compound represented by Formula II an excess of phosgene over that theoretically required for the formation of the isocyanate usually is employed, for example from 1.1 to 5 or 6 or even as high as 10 or more moles of phosgene per mole of the β-acyloxyethylamine hydrochloride. The temperature of the reaction may be varied over a wide range, e. g., from room temperature (20°–30° C.), or slightly thereabove, up to the reflux temperature of the reaction mass. Preferably the reaction is carried out at the boiling temperature of the mass under reflux. It will be understood, of course, that when mixtures of different β-acyloxyethylamine hydrochlorides are caused to react with phosgene, then the reaction product comprises a mixture of the corresponding acyloxyethyl isocyanates, from which the individual compounds can be separated by known methods, e. g., by distillation when the isocyanates produced by the reaction have boiling points sufficiently different from each other.

It is quite surprising and unexpected that β-acyloxyethyl isocyanates could be prepared by bringing phosgene and a β-acyloxyethylamine hydrochloride into contact with each other, since ordinarily it would be expected that the phosgene would cause the β-acyloxyethylamine salt to rupture at the point where the oxygen atom is linked to the acyl and ethylamine groupings.

Instead of a β-acyloxyethylamine hydrochloride, other addition salts of a β-acyloxyethylamine with a strong acid, more particularly a strong mineral acid, e. g., hydrobromic acid, may be used, but no particular advantages ordinarily accrue therefrom. Furthermore, the use of a salt other than the hydrochloride complicates the recovery problem since HCl is a by-product of the reaction between phosgene and the β-acyloxyethylamine salt.

The isocyanates produced in accordance with the present invention have a wide variety of uses including their use as intermediates in the preparation of other chemical compounds. For example, they may be thermally decomposed using a suitable catalyst to give vinyl isocyanate. Also, they can be reacted with amines to form the corresponding substituted urea.

The acyloxyethyl isocyanates resulting from our method also are valuable as a means of modifying, as by chemical reaction, other materials which are reactive or non-reactive per se, including compounds or substances containing one or more —OH groups, for instance: glycol, diethylene glycol, glycerine and other polyhydric alcohols; fatty oils of the kind exemplified by castor oil; diglycerides; alkyd resins containing —OH groups, including polymerizable unsaturated alkyd resins containing —OH groups; urea-formaldehyde reaction products, e. g., mono- and dimethylol ureas and their partial condensation products; melamine-formaldehyde reaction products, e. g., di-, tri-, tetra-, penta- and hexa-methylol melamines and their partial condensation products; acetylene urea; phenol-formaldehyde reaction products, e. g., saligenin and the more highly condensed phenol alcohols; polyvinyl phenols; sugars and starches; polyvinyl alcohol and partially esterified and etherified polyvinyl alcohols; polyallyl and polymethallyl alcohols and partially esterified and etherified polyallyl and polymethallyl alcohols; cellulose and cellulose derivatives containing free hydroxyl groups, e. g., partially esterified cellulose, partially etherified cellulose, etc.; partially or wholly methylolated acrylamides; water-soluble natural gums, e. g., agar agar, tragacanth, pectin, etc.; silicols and their partial condensation products, e. g., mono-, di- and trimethyl silicols and mixtures thereof, mono-, di- and triphenyl silicols and mixtures thereof, mixtures of any or all of the aforementioned methyl and phenyl silicols, partial condensation products of the aforementioned silicols and mixtures thereof; and acids, including, for example, cyanuric acid and derivatives thereof containing a hydrogen atom which is reactive with an isocyanate grouping. They also can be combined with nitrogen-containing materials, e. g., ethylene imine, polyethylene imines, ethylene diamine, diethylene triamine and other polyethylene amines, polymethylene diamines, alkanolamines (e. g., mono-, di- and triethanolamines, etc.), gelatin, chitin, monoamino and polyamino compounds such, for instance, as wool, silk, zein, casein, regenerated fibers from soyabean, casein, keratin, collagen, etc., to yield new and useful materials or articles of manufacture.

In order that those skilled in the art better may understand how the present invention can be carried into effect, the following examples are given by way of illustration and not by way of limitation.

*Example 1*

Thirty-one and two-tenth parts of β-aminoethyl acetate hydrochloride (β-acetyloxyethylamine hydrochloride) is suspended in 86 parts of toluene, and the resulting slurry is stirred and brought to reflux temperature (102° C.) over a period of 28 minutes. A moderate stream of phosgene is then bubbled into the stirred slurry. After stirring and heating for approximately 2 hours much of the β-aminoethyl acetate hydrochloride has dissolved, and after heating for an additional 2½ hours all of the solid dissolves, and the reaction mass reaches a maximum reflux temperature of 114° C. The introduction of the phosgene is discontinued at the end of this period of time, thereby stopping the reaction. The toluene is removed by distillation at 23°–36° C. under a pressure of 16–18 mm. of mercury. The β-acetyloxyethyl isocyanate is isolated by distillation of the toluene-free residue under reduced pressure, being obtained in the form of a colorless, mobile, lachrymatory liquid which boils at 62–63° C. under 8 mm. mercury pressure. The yield is 22.8 parts, which corresponds to 79% of the theoretical. The product reacts readily with aniline to form the corresponding substituted urea.

The foregoing reaction may illustrated by the following equation:

CH₃COOCH₂CH₂NH₂.HCl + COCl₂ →
$\qquad$ CH₃COOCH₂CH₂NCO + 3HCl

*Example 2*

Same as in Example 1 with the exception that, instead of β-acetyloxyethylamine hydrochloride, there is used an equivalent amount of β-phenylacetyloxyethylamine hydrochloride. The resulting β-phenylacetyloxyethyl isocyanate is isolated from the reaction mass as in Example 1.

*Example 3*

This example shows that the reaction involved in the preparation of a β-acyloxyethyl isocyanate from phosgene and a β-aminoethyl ester hydrochloride is apparently specific to the production of the β-acyloxyethyl derivatives.

Propanolamine hydrochloride (33.6 parts) and 0.1 part of p-toluene-sulfonic acid in 44 parts of xylene were heated to 125° C., after which 38 parts of acetic anhydride was added rapidly enough to maintain that temperature. The product was a thick, honey-like liquid, which was not purified further. This sample was combined with a similar material that had been obtained using a 100% excess of acetic anhydride.

The viscous product (93 parts) obtained above (presumably γ-aminopropyl acetate hydrochloride) suspended in dry toluene was treated with a slow stream of phosgene at 107° C. for 15 hours under reflux. Although the solution turned dark red, very little of the lower layer went into solution; i. e., the insoluble salt was not transformed into the soluble isocyanate.

We claim:

1. The method of preparing a compound represented by the general formula

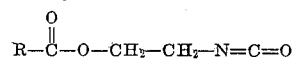

where R represents a radical selected from the class consisting of alkyl, cycloalkyl and aralkyl radicals, said method comprising effecting reaction between (1) phosgene and (2) a compound represented by the general formula

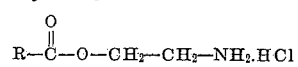

where R has the same meaning as given above, the said reaction being carried out while the said reactants are in contact with each other in a liquid medium in which they are inert, and isolating a compound represented by the first formula above-mentioned from the resulting reaction mass.

2. A method as in claim 1 wherein the phosgene of (1) and the compound of (2) are employed in the ratio of from 1.1 to 10 moles of the former per mole of the latter.

3. A method as in claim 1 wherein the reaction between the phosgene of (1) and the compound of (2) is effected at a temperature ranging between 20° C. and the reflux temperature of the reaction mass.

4. The method of preparing β-acetyloxyethyl isocyanate which comprises effecting reaction between β-acetyloxyethylamine hydrochloride and phosgene in the ratio of one mole of the former to more than one mole of the latter, the said reaction being carried out while the said reactants are in contact with each other in a volatile liquid medium in which they are inert and at a temperature ranging between 20° C. and the reflux temperature of the reaction mass, and isolating the β-acetyloxyethyl isocyanate from the resulting reaction mass.

5. The method of preparing β-acetyloxyethyl isocyanate which comprises forming a slurry of β-acetyloxyethylamine hydrochloride and an aromatic hydrocarbon having a lower boiling point than β-acetyloxyethyl isocyanate, passing phosgene into the stirred, refluxing slurry until the solid therein dissolves, distilling off the aromatic hydrocarbon from the resulting reaction mass, and then isolating β-acetyloxyethyl isocyanate by distillation of the residue under reduced pressure.

6. A method as in claim 5 wherein the aromatic hydrocarbon is toluene.

VERNON P. WYSTRACH.
JACK T. THURSTON.

REFERENCES CITED

The following references are of record in the file of this patent:

UNITED STATES PATENTS

| Number | Name | Date |
|---|---|---|
| 2,340,757 | Kaase | Feb. 1, 1944 |